United States Patent
Kuo et al.

(10) Patent No.: US 10,459,284 B1
(45) Date of Patent: Oct. 29, 2019

(54) POLARIZER

(71) Applicant: BenQ Materials Corporation, Taoyuan (TW)

(72) Inventors: Chen-Kuan Kuo, Taoyuan (TW);
Chia-Feng Lin, Taoyuan (TW);
Meng-Jie Lin, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 0 days.

(21) Appl. No.: 16/218,245

(22) Filed: Dec. 12, 2018

(30) Foreign Application Priority Data

Jul. 4, 2018 (TW) ................. 107123057 A

(51) Int. Cl.
*G02F 1/1335* (2006.01)

(52) U.S. Cl.
CPC .. *G02F 1/133528* (2013.01); *G02F 1/133504* (2013.01)

(58) Field of Classification Search
CPC .................................. G02F 1/1335
See application file for complete search history.

(56) References Cited

U.S. PATENT DOCUMENTS

| | | | | |
|---|---|---|---|---|
| 2008/0279243 A1* | 11/2008 | Oh | ............ | B82Y 20/00 372/45.011 |
| 2012/0205613 A1* | 8/2012 | Mi | ............ | B82Y 10/00 257/9 |
| 2013/0240348 A1* | 9/2013 | Mi | ............ | H01L 31/03044 204/157.5 |

* cited by examiner

*Primary Examiner* — Sang V Nguyen

(57) ABSTRACT

A polarizer for the display side of a liquid crystal display is provided. The polarizer comprises a polarizing layer, a light collimation layer and a quantum dot diffraction layer. The polarizing layer has a light incident surface and a light exiting surface. The light collimation layer is disposed on the light exiting surface of the polarizing layer. The quantum dot diffraction layer is disposed on the light collimating layer on the opposite side of the polarizing layer, and comprises a diffraction microstructure layer disposed on the light collimation layer, and a quantum dot planarization layer which fills and planarizes the diffraction microstructure layer and can be divided into a plurality of pixel regions.

14 Claims, 5 Drawing Sheets

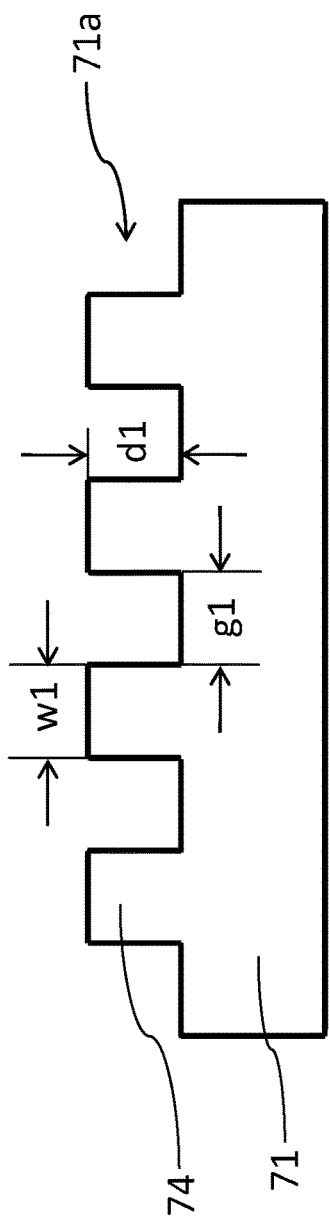
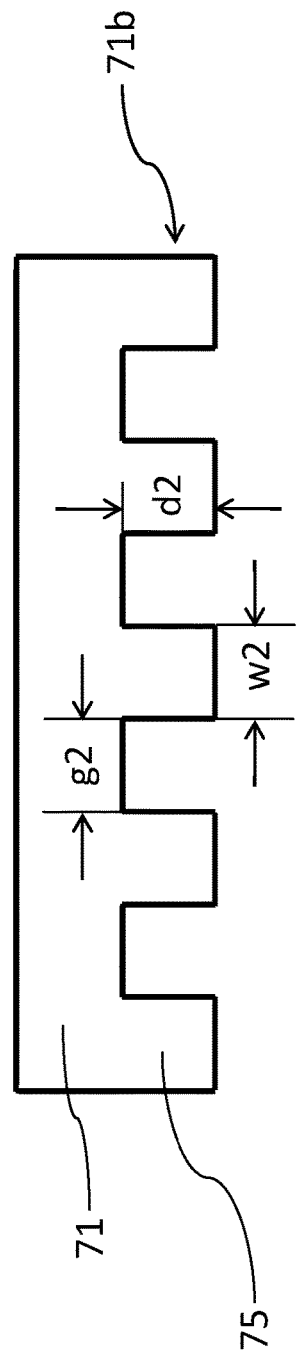
FIG. 5A
FIG. 5B

POLARIZER

This application claims the benefit of Taiwanese application serial No.107123057, filed on Jul. 4, 2018, the subject matter of which is incorporated herein by reference.

BACKGROUND OF THE INVENTION

Field of the Invention

The invention relates in general to a display side polarizer for a liquid crystal display (LCD), which can increase LCD's color gamut and optical efficiency such as contrast, color saturation and color accuracy at wide viewing angles.

Description of the Related Art

Displays with high contrast, no gray-scale inversion, no color shift or slight color shift, high brightness, wide color gamut, high color saturation, fast response speed and wide viewing angle are current market trends. Referring to FIG. 1, it shows a cross-sectional view of a conventional liquid crystal display 1. The conventional liquid crystal display 1 includes a liquid crystal module 2 and a backlight module 3. Because the liquid crystal display is a non-self-luminous display, the liquid crystal module 2 needs to be provided with a light source by the backlight module 3 to display an image. Therefore, when the light is vertically and obliquely incident into the liquid crystal layer 23, since the liquid crystal molecules 23a have different symmetry at different viewing angles, the projection components perceived by the vertical incident light L and the oblique incident light L' passing through the liquid crystal molecules 23a are inconsistent, and it is easy to see the phenomenon of color washout or gray-scale inversion when viewing from the side view, resulting in low contrast or abnormal color performance of the image. Therefore, the image quality does not perform as well as a self-luminous display such as an organic light emitting diode (OLED).

Currently, several methods have been proposed to improve the above shortcomings. For example, a wide viewing angle film (not shown) is disposed on the display side polarizer 21 and the backlight side polarizer 22 of the conventional liquid crystal display 1 to equalize the images between the central viewing angles and the wide viewing angles; a diffusion film or a diffraction film (not shown) is attached on the surface of the display side polarizer 21 to increase the light intensity and contrast at wide viewing angles; quantum dot material is added to the diffusion plate 33 of the backlight module 3; or the quantum dot material is directly used to fabricate the color filter 24 of the liquid crystal module 2 to increase the color saturation and color gamut of the images.

However, the wide viewing angle film for the liquid crystal display is expensive. The diffusion film disposed on the surface of the display side polarizer 21 is difficult to accurately control the direction of the light emitted from different angles of the display, and when the content of the particles in the diffusion film is insufficient, the degree of light scattering cannot be sufficient to transfer the light to larger viewing angles to obtain a non-color shift image at the side viewing angle, and when the content of the particles in the diffusing film is too much, the degree of scattering is too strong and easily appears whitening image to affect the image saturation and contrast. Meanwhile, it is difficult for the diffraction film to synchronously control the light paths of the various viewing angles in different dimensions by the general diffraction structure layer. Adding the quantum dot material to the diffusion plate 33 or the color filter 24 allows the light emitted from the backlight 31 to excite the quantum dots to generate a light with narrow full width at half maximum (FWHM) wavelength to form a wide color gamut image, but the liquid crystal display is still not self-illuminating, and the light emitted from the backlight 31 is uniformly dispersed to each area of the conventional liquid crystal display 1 by the light guide plate 32 and the diffusion particles 33a in the diffusion plate 33, so that the emitted light from the backlight 31 finally has a portion of the normal incident light L and a portion of the oblique incident light L', and therefore, the side view image is still affected by the liquid crystal molecules 23a and appears color shift or gray-scale inversion. In addition, the color filter 24 needs to have a certain content of the quantum dot material to obtain sufficient color saturation, but the liquid crystal module 2 at least comprises the electrode layer 25, the liquid crystal layer 23, and the color filter 24 disposed between the display side polarizer 21 and the backlight side polarizer 22, and if the content is too large, thereby the polarization degree of light passing through the backlight side polarizer 22 is depolarized by scattering, and the light intensity passing through the display side polarizer 21 is decreased.

Therefore, the present invention is to provide a display side polarizer integrated with quantum dots and diffraction structure layer for increasing color gamut of the liquid crystal display and reducing color washout and gray-scale inversion at wide viewing angles of the liquid crystal display, and increasing the backlight efficiency of the liquid crystal display.

SUMMARY OF THE INVENTION

In an aspect of the display side polarizer of present invention, the display side polarizer comprises a polarizing layer having a light incident surface and a light exiting surface; a light collimation layer disposed on the light exit surface of the polarizing layer; and a quantum dot diffraction layer disposed on the light collimation layer opposite to the polarizing layer, and comprising a diffraction microstructure layer disposed on the light collimation layer, and a quantum dot planarization layer which fills and planarizes the diffraction microstructure layer and can be divided into a plurality of pixel regions.

In an embodiment of the display side polarizer of present invention, the plurality of pixel regions of the quantum dot planarization layer comprises red light conversion regions including a first quantum dot material, green light conversion regions including a second quantum dot material and blue light transmission regions including a transparent material.

In another embodiment of the display side polarizer of present invention, the quantum dot planarization layer further comprises a plurality of diffusion beads dispersed thereof to increase conversion efficiency and homogenize light.

In another embodiment of the display side polarizer of present invention, the diffraction microstructure layer includes a first grating surface having a plurality of first gratings extending in a first grating direction.

In another embodiment of the display side polarizer of present invention, the diffraction microstructure layer includes a first grating surface having a plurality of first gratings extending in a first grating direction, and a second grating surface opposite to the first grating surface having a plurality of second gratings extending in a second grating direction, wherein the first grating direction and the second grating direction cross each other at an angle of 90°±10°.

In another embodiment of the display side polarizer of present invention, the diffraction microstructure layer has a first refraction index of n1, the quantum dot planarization layer has a second refraction index of n2, the light collimation layer has a third refraction index of n3, and n1, n2 and n3 are all in the range of 1.4 to 1.7.

In another embodiment of the display side polarizer of present invention, n1 is greater than n2 and n3.

In another embodiment of the display side polarizer of present invention, n2 and n3 can be the same or different.

In another embodiment of the display side polarizer of present invention, the difference of n1 and n2 is no less than 0.1 and no more than 0.3.

In another embodiment of the display side polarizer of present invention, the difference of n1 and n3 is no less than 0.1 and no more than 0.3.

In another embodiment of the display side polarizer of present invention, each of the first gratings has a width of w1, each of the second gratings has a width of w2, and w1, w2 are independently in the range of 0.1 μm to 1.5 μm.

In another embodiment of the display side polarizer of present invention, each of the first gratings has a depth of d1, each of the second gratings has a depth of d2, and d1, d2 are independently in the range of 0.5 μm to 1.5 μm.

In another embodiment of the display side polarizer of present invention, the grating gap of g1 between adjacent two of the first gratings and the grating gap of g2 between adjacent two of the second gratings are independently in the range of 0.1 μm to 1.5 μm.

In another embodiment of the display side polarizer of present invention, the widths, the depths and the grating gaps of the first gratings and the second gratings can be the same or different.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 5A is a cross-sectional view along the X-axis direction of the first grating surface on the diffraction microstructure layer as shown in FIG. 4.

FIG. 5B is a cross-sectional view along the Y-axis direction of the second grating surface on the diffraction microstructure layer as shown in FIG. 4.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings the structure of the apparatus known only schematically depicted in figures.

Figure 1:
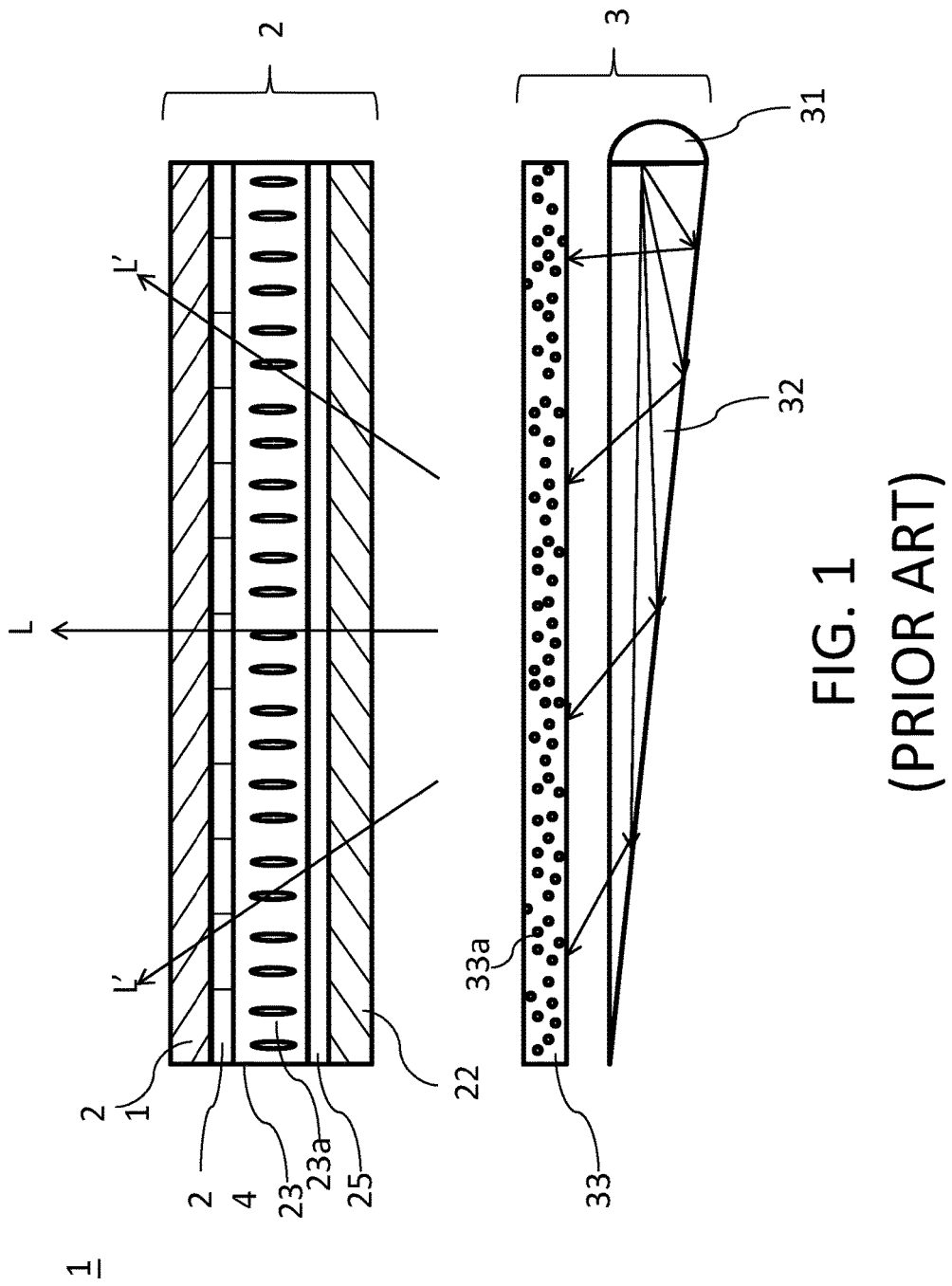
FIG. 1 is a cross-sectional view of a conventional liquid crystal display.
Figure 2:
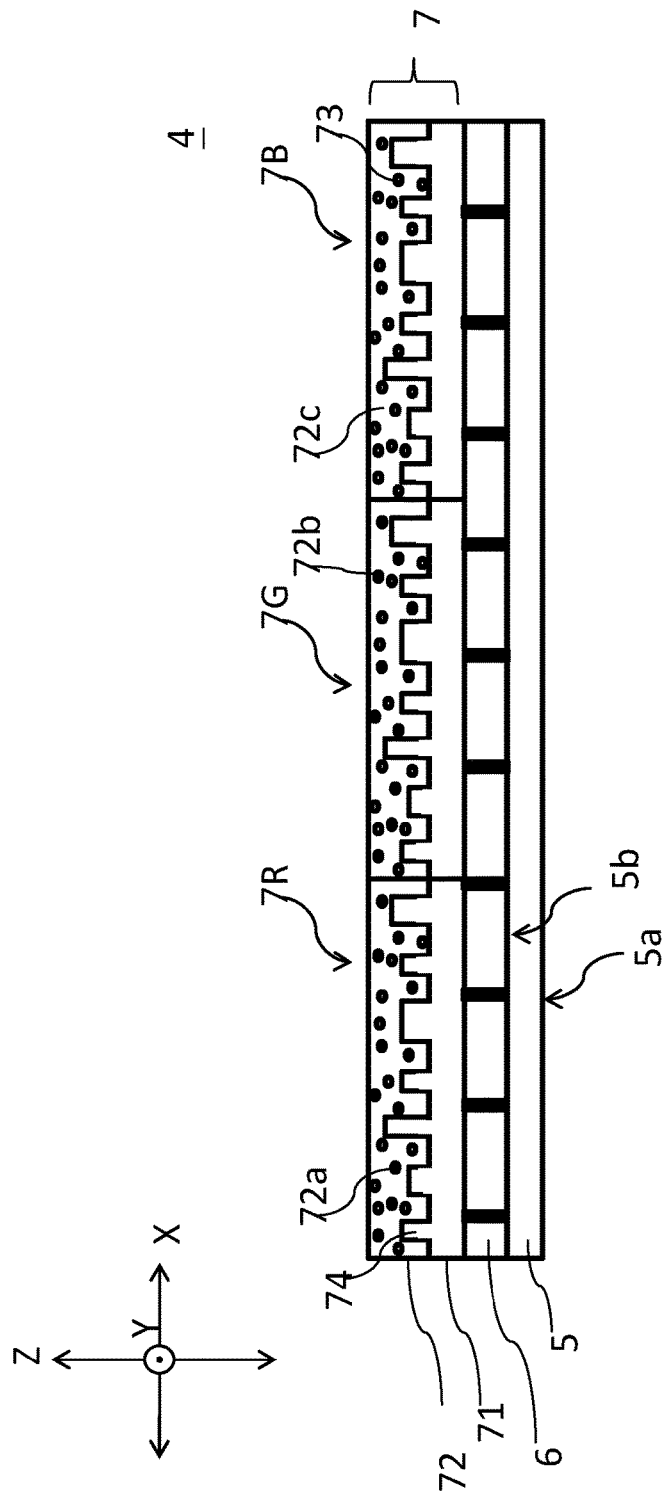
FIG. 2 is a stereoscopic perspective view of a display side polarizer of a preferred embodiment of the present invention.

Referring to FIG. 2, FIG. 2 is a stereoscopic perspective view of a display side polarizer according to a preferred embodiment of the present invention. As shown in FIG. 2, the display side polarizer4 comprises a polarizing layer5 having a light incident surface 5a and a light exiting surface 5b; a light collimation layer 6 disposed on the light exit surface 5b of the polarizing layer 5; and a quantum dot diffraction layer 7 disposed on the light collimating layer 6 on the opposite side of the polarizing layer 5, and comprising a diffraction microstructure layer 71 disposed on the light collimation layer 6, and a quantum dot planarization layer72 which fills and planarizes the diffraction microstructure layer 71 and can be divided into a plurality of pixel regions.

In an embodiment of the display side polarizer4 of present invention, the plurality of pixel regions of the quantum dot planarization layer 72 comprises red light conversion regions 7R including a first quantum dot material 72a, green light conversion regions 7G including a second quantum dot material 72b and blue light transmission regions 7B including a transparent material. The first quantum dot material 72a and the second quantum dot material 72b are semiconductor materials selected from a group consisting of group III-V, group II-VI and group IV-VI compounds or combinations thereof. The semiconductor materials can be but not limited to, for example, such as AlN, AlP, AlAs, AlSb, GaN, GaP, GaAs, GaSb, InN, InP, InSb, ZnO, ZnS, ZnSe, ZnTe, CdS, CdSe, CdTe, HgSe, HgTe, PbS, PbSe, PbTe. The first quantum dot material 72a comprises at least one red light quantum dot material with a particle diameter of, for example, 5 nm to 7 nm, so that the red light in a wavelength range of 620 nm to 650 nm can be excited when the blue backlight passing through the red light conversion regions 7R. The second quantum dot material 72b comprises at least one green light quantum dot material with a particle diameter of, for example, 2.5 nm to 3.5 nm, so that a green light in a wavelength range of 520 nm to 580 nm can be excited when the blue backlight passing through the green light conversion regions 7G. The blue light transmission regions 7B do not contain quantum dot materials, so that the blue backlight can directly penetrate. Therefore, red, green, and blue pixels can be formed to replace the color filter used in the conventional liquid crystal display. Moreover, since the blue backlight directly passes or passes through the quantum dot diffraction layer 7, different colors are excited, and it is different from the color filter of the conventional liquid crystal display forming colors by absorbing to filter light, so that the utilization rate of the backlight is better, and the excited light can provide the liquid crystal display with better color saturation and color gamut area. The method for forming the quantum dot planarization layer 72 on the diffraction microstructure layer 71 includes, but is not limited to, coating or inkjet printing, etc., for example, a photo-curable resin dispersed with a quantum dot material is provided to fill and planarize the diffraction microstructure layer 71, and a quantum dot diffraction layer 7 having the diffraction microstructure layer 71 and the quantum dot planarization layer 72 can be generated after curing and further encapsulating the photo-curable resin to prevent from water vapor and oxygen.

Figure 3:
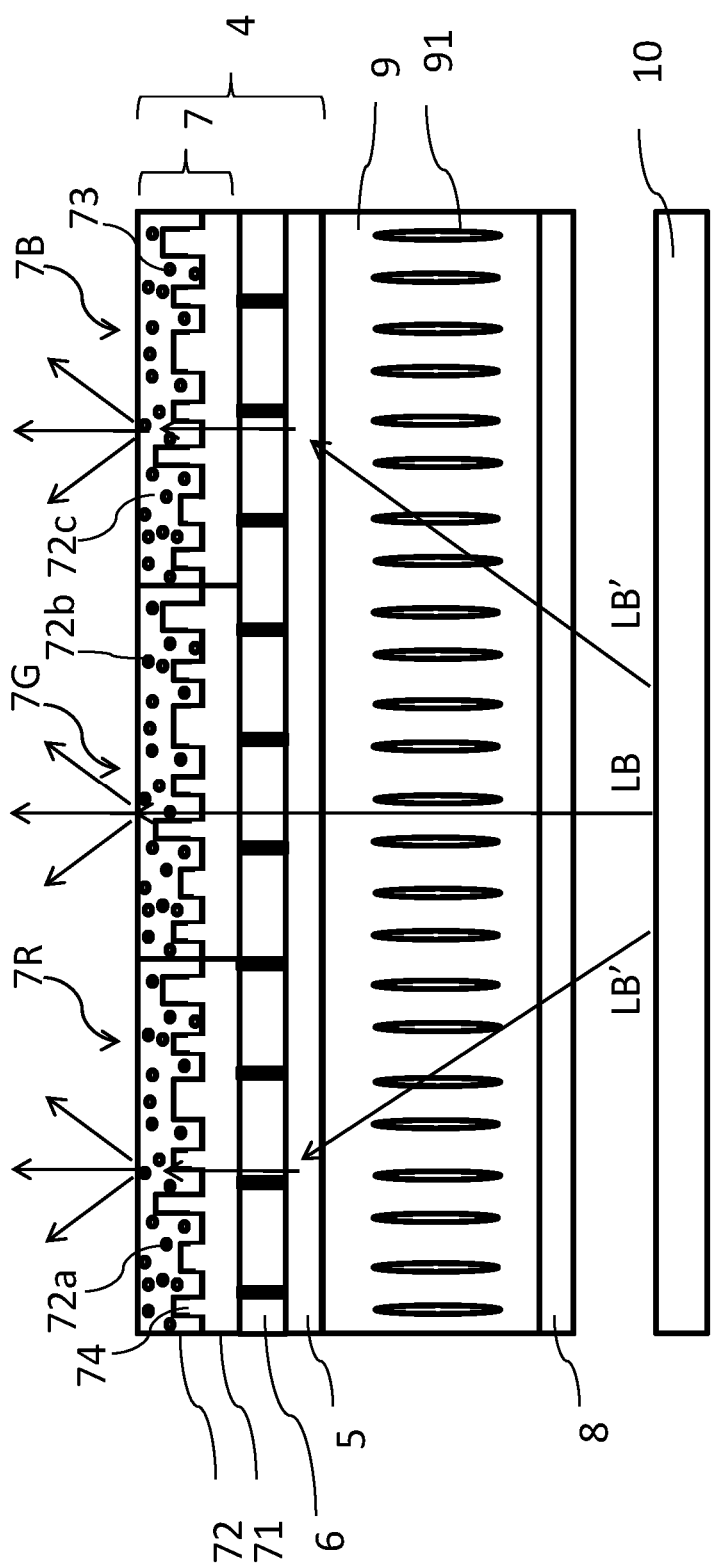
FIG. 3 is a stereoscopic perspective view of the display side polarizer applied to a liquid crystal display of a preferred embodiment of the present invention.

Referring to FIG. 3, FIG. 3 is a stereoscopic perspective view of the display side polarizer applied to a liquid crystal display according to a preferred embodiment of the present invention. As shown in FIG. 3, a blue backlight module 10 emits only blue light having a wavelength range of about 440 nm to 460 nm, and can be divided into vertical blue incident light LB and oblique blue incident light LB' according to the incident angles to the liquid crystal layer 9. Although the projection components of the liquid crystal molecules 91 perceived by the vertical blue incident light LB and the oblique blue incident light LB' passing through the liquid crystal layer 9 are inconsistent, only the light in the direction of the vertical incident direction is retained when the light passing through the light collimating layer 6 of the display side polarizer 4 of the present invention, so that the side view image with poor effect such as color shift is not formed. Further, since the display side polarizer 4 and the backlight side polarizer 8 have a higher orthogonality of the absorption axis for the vertical blue incident light LB, a better dark state image can be obtained. However, the viewing angle of the liquid crystal display is also limited. Therefore, the quantum dot diffraction layer 7 of the display side polarizer 4 of the present invention further has the diffraction microstructure layer 71, which further makes the vertical blue incident light LB deflected to the side viewing angle when be incident into the diffraction microstructure layer 71, and the viewing angle of the liquid crystal display is restored to a wide viewing angle. In addition, the blue incident light enters the plurality of red light conversion regions 7R, green light conversion regions 7G, and blue light transmission regions 7B in the quantum dot diffraction layer 7 to generate red, green, and blue pixels. Therefore, the imaging position of the images is relatively on the outermost side of the display side. Accordingly, the display side polarizer 4 of the present invention can achieve the display quality like a self-luminous display such as an organic light emitting diode (OLED), and the color performance at different viewing angles is less susceptible to symmetry of liquid crystal molecules.

Further, unlike the color filter the conventional liquid crystal display device is sandwiched between the display side polarizer 4 and the backlight side polarizer 8, the quantum dot diffraction layer 7 of the display side polarizer 4 of the present invention is disposed on outside of the liquid crystal display instead. Therefore, unlike the polarization of the polarized light will be self-absorbed or scattered by the quantum dots dispersed in the conventional color filter and resulted in decreasing of image saturation and contrast caused by dark state light leakage after the polarized light passing through the display side polarizer 4, the polarization of the polarized light formed by the light passing through the backlight side polarizer 8 of the present invention is not easily reduced, thereby the dark state light leakage can be avoided.

As shown in FIG. 2, in another embodiment of the display side polarizer 4 of present invention, the quantum dot planarization layer 72 further comprises a plurality of diffusion beads 73 dispersed thereof to increase conversion efficiency and homogenize light.

As shown in FIG. 2, in another embodiment of the display side polarizer of present invention, the diffraction microstructure layer 71 includes a first grating surface 71a having a plurality of first gratings 74 extending in a first grating direction (such as the Y-axis direction in the drawing), and the first direction is preferably selectively parallel or perpendicular to the absorption axis (not shown) of the polarizing layer 5.

Figure 4:
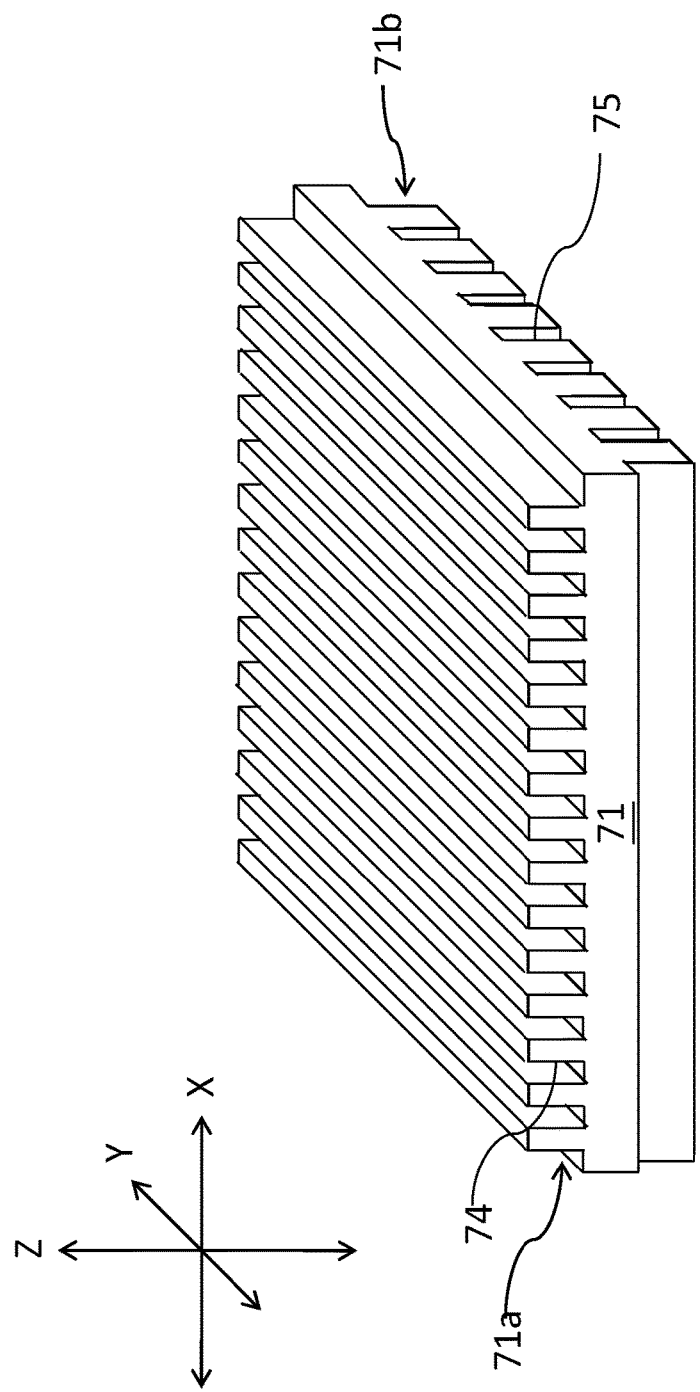
FIG. 4 is a stereoscopic perspective view of the first grating surface and the second grating surface of the diffraction microstructure layer of the display side polarizer of a preferred embodiment of the present invention.

Referring to FIG. 4, FIG. 4 is a stereoscopic perspective view of the diffraction microstructure layer of the display side polarizer of a preferred embodiment of the present invention. In another embodiment of the display side polarizer of present invention, The diffraction microstructure layer 71 of the polarizer further includes a second grating surface 71b, including a plurality of second gratings 75 extending in a second grating direction (such as the X-axis direction in the drawing), disposed opposite to the first grating surface 71a, wherein the first grating direction and the second grating direction cross each other at an angle of 90°±10°.

In another embodiment of the display side polarizer of present invention, the diffraction microstructure layer 71 has a first refraction index of n1, the quantum dot planarization layer 72 has a second refraction index of n2, the light collimation layer 6 has a third refraction index of n3, and n1, n2 and n3 are all in the range of 1.4 to 1.7. In addition, the materials of diffraction microstructure layer 71 can be thermo-curable resins or photo-curable resins, such as acrylic resin, silicone resin, polyurethane resin, epoxy resin or combinations thereof.

In another embodiment of the display side polarizer of present invention, n1 is greater than n2 and n3.

In another embodiment of the display side polarizer of present invention, n2 and n3 can be the same or different.

In another embodiment of the display side polarizer of present invention, the difference of n1 and n2 is no less than 0.1 and no more than 0.3.

In another embodiment of the display side polarizer of present invention, the difference of n1 and n3 is no less than 0.1 and no more than 0.3.

The dimensions, periods, etc. of the first gratings 74 on the first grating surface 71a and the second gratings 75 on the second grating surface 71b of the diffraction microstructure layer 71 may be varied in accordance with the resolutions and the pixel sizes of the desired display. Moreover, since the wavelength of the light emitted by the blue backlight module is only in the range of blue light, and the incident blue light passing through the diffraction microstructure layer 71 is diffracted and directed to side viewing angles to excite the red light quantum dots 72a in the quantum dot material layer 72 and the green light quantum dots 72b in the second quantum dot material layer 73 or transmit through a transparent material 72c. Therefore, unlike the liquid crystal display utilizing the conventional RGB color filter, the consideration of the diffraction angle of different color wavelength and the light intensity of each viewing angle is not necessary for the liquid crystal display according to this present invention. It can be calculated by the following diffraction formula (Equation 1) for the appropriate period range of the first gratings 74 or the second gratings 75 and the desired viewing angles.

$$n' \sin \phi_o - n \sin \phi_i = m\lambda/\Lambda \qquad \text{Equation 1}$$

In Equation 1, n is the refractive index of the medium of the light incident side, n' is the refractive index of the medium at the light exit side, $\phi_i$ is the light incident angle, $\phi_o$ is the light exit angle, m is the diffraction order, and λ is wavelength of the incident light. Λ is the grating period. $\phi_i$ is 0 when the incident light is a blue light of 450 nm wavelength and the light is incident perpendicularly on the diffraction microstructure layer 71 due to the effect of the light collimating layer 6. If the first-order diffracted light is to be diffracted to a viewing angle of 10° to 80°, the grating period Λ of the first gratings 74 or the second gratings 75 will be between 300 nm and 1700 nm, and the grating period can be correspondingly adjusted to a better period range accordance with different viewing angles, gray-scale inversion angles, etc. of the liquid crystal display to improve and enhance the image quality of a specific viewing angle.

Referring to FIG. 4, FIG. 5A and FIG. 5B together, FIG. 5A is a cross-sectional view along the X-axis direction of the first grating surface 71a on the diffraction microstructure layer 71 as shown in FIG. 4. In another embodiment of the display side polarizer of present invention, each of the first gratings 74 has a width of w1 in the range of 0.1 μm to 1.5 μm and preferably in the range of 0.4 μm to 0.6 μm, a depth of d1 in the range of 0.5 μm to 1.5 μm and preferably in the range of 0.7 μm to 1.3 μm, and a grating gap of g1 between adjacent two of the first gratings 74 in the range of 0.1 μm to 1.5 μm and preferably in the range of 0.4 μm to 0.6 μm. In addition, when the display side polarizer 4 is disposed on the liquid crystal display with a specific pixel size range, the first gratings 74 of the first grating surface 71a can have the same or different dimensions, and can be sequentially and periodically or randomly formed on the first grating surface 71a of the diffraction microstructure layer 71 to avoid the formation of diffraction moire and to interfere with the image quality.

As shown in FIG. 5B, FIG. 5B is a cross-sectional view along the Y-axis direction of the second grating surface 71b on the diffraction microstructure layer 71 as shown in FIG. 4. In another embodiment of the display side polarizer of present invention, each of the second gratings 75 has a width of w2 in the range of 0.1 μm to 1.5 μm and preferably in the range of 0.4 μm to 0.6 μm, a depth of d2 in the range of 0.5 μm to 1.5 μm and preferably in the range of 0.7 μm to 1.3 μm, and a grating gap of g2 between adjacent two of the first gratings 74 in the range of 0.1 μm to 1.5 μm and preferably in the range of 0.4 μm to 0.6 μm. In addition, when the display side polarizer 4 is disposed on the liquid crystal display with a specific pixel size range, the second gratings 75 of the second grating surface 71b can have the same or different dimensions, and can be sequentially and periodically or randomly formed on the second grating surface 71b of the diffraction microstructure layer 71 to avoid the formation of diffraction moire and to interfere with the image quality.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A display side polarizer for a liquid crystal display, comprising:
    a polarizing layer having a light incident surface and a light exiting surface;
    a light collimation layer disposed on the light exiting surface of the polarizing layer; and
    a quantum dot diffraction layer disposed on the light collimating layer opposite to the polarizing layer, and comprising a diffraction microstructure layer disposed on the light collimation layer, and a quantum dot planarization layer which fills and planarizes the diffraction microstructure layer and can be divided into a plurality of pixel regions.

2. The display side polarizer according to claim 1, wherein the plurality of pixel regions of the quantum dot planarization layer comprises red light conversion regions including a first quantum dot material, green light conversion regions including a second quantum dot material and blue light transmission regions including a transparent material.

3. The display side polarizer according to claim 1, the quantum dot planarization layer further comprising a plurality of diffusion beads dispersed thereof to increase conversion efficiency and homogenized light.

4. The display side polarizer according to claim 1, the diffraction microstructure layer including a first grating surface having a plurality of first gratings extending in a first grating direction.

5. The display side polarizer according to claim 1, the diffraction microstructure layer including a first grating surface having a plurality of first gratings extending in a first grating direction, and a second grating surface opposite to the first grating surface having a plurality of second gratings extending in a second grating direction, wherein the first grating direction and the second grating direction cross each other at an angle of 90°±10°.

6. The display side polarizer according to claim 1, wherein the diffraction microstructure layer has a first refraction index of n1, the quantum dot planarization layer has a second refraction index of n2, the light collimation layer has a third refraction index of n3, and n1, n2 and n3 are all in the range of 1.4 to 1.7.

7. The display side polarizer according to claim 6, wherein n1 is greater than n2 and n3.

8. The display side polarizer according to claim 6, wherein n2 and n3 can be the same or different.

9. The display side polarizer according to claim 6, wherein the difference of n1 and n2 is no less than 0.1 and no more than 0.3.

10. The display side polarizer according to claim 6, wherein the difference of n1 and n3 is no less than 0.1 and no more than 0.3.

11. The display side polarizer according to claim 5, wherein each of the first gratings has a width of w1, each of the second gratings has a width of w2, and w1, w2 are independently in the range of 0.1 μm to 1.5 μm.

12. The display side polarizer according to claim 5, wherein each of the first gratings has a depth of d1, each of the second gratings has a depth of d2, and d1, d2 are independently in the range of 0.5 μm to 1.5 μm.

13. The display side polarizer according to claims 5, wherein the grating gap of g1 between adjacent two of the first gratings and the grating gap of g2 between adjacent two of the second gratings are independently in the range of 0.1 μm to 1.5 μm.

14. The display side polarizer according to claims 5, wherein the widths, the depths and the grating gaps of the first gratings and the second gratings can be the same or different.

* * * * *